United States Patent [19]
VanKerkhove

[11] Patent Number: 5,757,493
[45] Date of Patent: May 26, 1998

[54] INTERFEROMETER WITH CATADIOPTRIC IMAGING SYSTEM HAVING EXPANDED RANGE OF NUMERICAL APERTURE

[75] Inventor: Steven J. VanKerkhove, Rochester, N.Y.

[73] Assignee: Tropel Corporation, Fairport, N.Y.

[21] Appl. No.: 734,402

[22] Filed: Oct. 16, 1996

[51] Int. Cl.$^6$ ............................................. G01B 11/00
[52] U.S. Cl. ........................ 356/359; 356/360; 359/487; 359/727
[58] Field of Search ................................ 356/359–360; 359/487, 727

[56] References Cited

U.S. PATENT DOCUMENTS

| | | | |
|---|---|---|---|
| 2,661,658 | 12/1953 | Dyson . | |
| 4,869,593 | 9/1989 | Biegen | 356/359 |
| 4,881,815 | 11/1989 | Sommargren | 356/358 |
| 4,881,816 | 11/1989 | Zanoni | 356/358 |
| 4,883,357 | 11/1989 | Zanoni et al. | 356/358 |
| 4,953,960 | 9/1990 | Williamson . | |
| 5,031,976 | 7/1991 | Shafer . | |
| 5,031,977 | 7/1991 | Gibson . | |
| 5,155,554 | 10/1992 | Schnable et al. | 356/359 |
| 5,206,515 | 4/1993 | Elliott et al. | 250/492.2 |
| 5,212,593 | 5/1993 | Williamson et al. | 359/487 |
| 5,220,454 | 6/1993 | Ichihara et al. | 359/487 |
| 5,241,423 | 8/1993 | Chiu et al. | 359/727 |
| 5,251,070 | 10/1993 | Hashimoto et al. | 359/727 |
| 5,289,312 | 2/1994 | Hashimoto et al. | 359/487 |
| 5,327,219 | 7/1994 | Steimle et al. | 356/359 |
| 5,402,267 | 3/1995 | Fürter et al. | 359/727 |
| 5,410,408 | 4/1995 | Evans et al. | 356/359 |
| 5,461,456 | 10/1995 | Michaloski | 355/67 |

FOREIGN PATENT DOCUMENTS

| | | |
|---|---|---|
| 4203464 | 8/1992 | Germany . |
| 149910 | 3/1962 | U.S.S.R. . |

OTHER PUBLICATIONS

A New Series of Microscope Objectives: I. Catadioptric Newtonian Systems and II. Preliminary Investigation of Catadioptric Schwarzchild Systems by David S. Grey and Paul H. Lee, Journal of the Optical Society of America, vol. 39, No. 9, Sep. 1949, pp. 719–728.

"Optical System Design", by Rudolf Kingslake, Academic Press, Inc., Orlando, Florida, 1983, Chapter 14, pp. 245–246.

"Interpretation of Interferograms", The Photonics Design and Applications Handbook, 1990, pp. H35–H40.

"Using Spherical Mirrors for the Infrared", The Photonics Design and Applications Handbook, 1990, pp. H204–H205.

*Primary Examiner*—Frank G. Font
*Assistant Examiner*—Jason D. Vierra-Eisenberg
*Attorney, Agent, or Firm*—Eugene Stephens & Associates

[57] ABSTRACT

A catadioptric imaging system for an interferometer includes a beamsplitter plate for reflecting a beam of light to a concave mirror for transmitting reflected light from the mirror. The beamsplitter reflections and transmissions produce opposite sign spherical aberrations. A refractive optic is located between the beamsplitter plate and a convex test surface for removing residual spherical aberrations and for permitting more variability in the positioning of the beamsplitter plate. Design variables for both the refractive optic and the position of the beamsplitter plate can be used to adjust a numerical aperture of the beam approaching the test surface. The refractive optic can also be used as a Fizeau objective to further reduce errors in the imaging system.

34 Claims, 4 Drawing Sheets

INTERFEROMETER WITH CATADIOPTRIC IMAGING SYSTEM HAVING EXPANDED RANGE OF NUMERICAL APERTURE

TECHNICAL FIELD

The invention relates to the field of optical metrology and more specifically to interferometers having catadioptric imaging systems for measuring convex surfaces.

BACKGROUND

This invention furthers my previous invention with George Schnable disclosed in U.S. Pat. No. 5,155,554 and entitled Large Aperture Reflective Interferometer for Measuring Convex Spherical Surfaces. Both inventions are directed to the same overall objective of optically measuring large aperture convex surfaces. However, my new invention is directed to measuring convex surfaces with wider ranges of size and numerical aperture.

Convex surfaces, like planar or concave surfaces, can be optically measured by comparing a test wavefront incident to the convex surface with a reference wavefront. Actual measurements are made by evaluating a resulting interference pattern produced by combining the two wavefronts. The incident test wavefront is a converging wavefront shaped by optical components that are necessarily much larger than the convex surfaces under test. Large lenses for producing such converging wavefronts are difficult to make to required measurement accuracy; and, prior to my co-invention with Mr. Schnable, this difficulty limited the size of convex surfaces that could be measured by normal interferometric methods.

My co-invention used a catadioptric imaging system for producing the converging test beam (wavefront). A spherically diverging beam from a point source emanated through a transmissive central aperture of a large concave spherical mirror and was reflected by a beamsplitter plate back toward the concave spherical mirror as a further diverging beam. The concave spherical mirror reflected the further diverging beam as a converging beam that was transmitted through the beamsplitter plate on a path of normal incidence to a convex test surface.

Such large concave spherical mirrors can be manufactured to higher accuracy than similarly sized lenses. However, the transmission of a converging beam through a beamsplitter plate produces a spherical aberration characterized by meridian rays that are focused farther from the plate than paraxial rays of the converging beam. My co-invention solved this problem by adjusting the position of the beamsplitter plate with respect to the concave spherical mirror to produce a canceling spherical aberration of opposite sign characterized by meridian rays that are focused closer to the plate than paraxial rays of the converging beam. That is, instead of reflecting the further diverging beam at normal incidence to the concave mirror, the beamsplitter plate was moved either toward or away from the concave mirror to refocus the point source in a position that departs from the mirror's center of curvature.

Thus, the spherical aberration caused by transmission through a beamsplitter plate was canceled by an opposite spherical aberration caused by locating the beamsplitter plate in a position that focuses the concave spherical mirror at a departure from unit magnification.

While my co-invention has greatly expanded possibilities for optically measuring convex surfaces, the positioning requirements of the beamsplitter plate limit the size (i.e., diameter) and numerical aperture of the convex surfaces that can be measured with any one combination of concave mirror and beamsplitter plate. Also, the long optical pathway of the test beam through the catadioptric imaging system subjects the measurement to systematic and environmental errors. Errors in the optical design for conveying the test beam and environmental conditions differentially affecting the test and reference beams reduce measurement accuracy by varying optical path lengths between the test and reference beams beyond the variations that are intended to represent errors in the convex surfaces.

SUMMARY OF INVENTION

My invention further expands ranges of size and numerical aperture of convex surfaces measured with interferometers that shape converging test wavefronts with catadioptric imaging systems. Further improvements in wavefront quality are also made possible, and the resulting measurements can be made less sensitive to systematic or environmental errors.

One version of my invention as an improved catadioptric imaging system for an interferometer includes the known features of a light source, a beamsplitter plate, a concave mirror, and a test surface support. The beamsplitter plate has a partially reflective surface for reflecting a diverging beam from the light source as a further diverging beam. The concave mirror reflects the further diverging beam as a converging beam. The partially reflective surface of the beamsplitter plate is also partially transmissive for transmitting the converging beam toward a convex test surface. The test surface support positions the convex test surface for substantially retroreflecting the converging beam as a re-diverging beam on a return path toward the light source.

However, instead of positioning the beamsplitter plate to compensate for spherical aberration caused by transmissions through the plate, the plate can be adjusted toward or away from the concave mirror to adjust the maximum size (i.e., diameter) and numerical aperture of the converging beam. Movement of the plate toward the concave mirror increases the maximum size of the measurable convex test surfaces but reduces their numerical aperture. Movement of the plate away from the concave mirror decreases the maximum size of the measurable convex test surfaces but increases their numerical aperture.

A refractive optic, including one or more individual refractive optical elements located between the beamsplitter plate and the test surface support, further reshapes the converging beam for accomplishing a variety of purposes. First, the refractive optic can be designed to compensate for residual spherical aberration associated with the expanded range of beamsplitter plate positions. Second, the refractive optic can be used to further adjust the numerical aperture of the converging beam. Third, an objective surface of the refractive optic can be arranged to form a so-called Fizeau cavity with the convex test surface, which alters the fundamental design of the interferometer to provide common paths for both test and reference beams through the catadioptric imaging system.

Instead of separating a primary beam into separate test and reference beams in advance of the catadioptric imaging system and directing only the test wavefront through the catadioptric imaging system, the objective surface can be used to separate the test and reference beams within the catadioptric imaging system just in advance of the convex test surface. In fact, except within the cavity separating the objective surface from the convex test surface, the test and the reference beams remain combined along a common pathway through the catadioptric imaging system both toward and away from the convex test surface. Further improved measurement accuracy is possible because optical imperfections in the imaging system tend to affect both the test and the reference beams equally.

Light preferably enters the catadioptric imaging system through a focusing system that converts a collimated beam of light from the light source into a diverging beam from a point source. The collimated beam is substantially temporally coherent, and the diverging beam from the point source is substantially spatially coherent. However, one embodiment of my invention also provides for interrupting the collimated beam with an aspheric plate to further control aberrations in the catadioptric imaging system. The aspheric plate is particularly useful for correcting large spherical aberrations that cannot be adequately corrected by adjustments of the beamsplitter plate and refractive optic alone.

DRAWINGS

DETAILED DESCRIPTION

Figure 1:
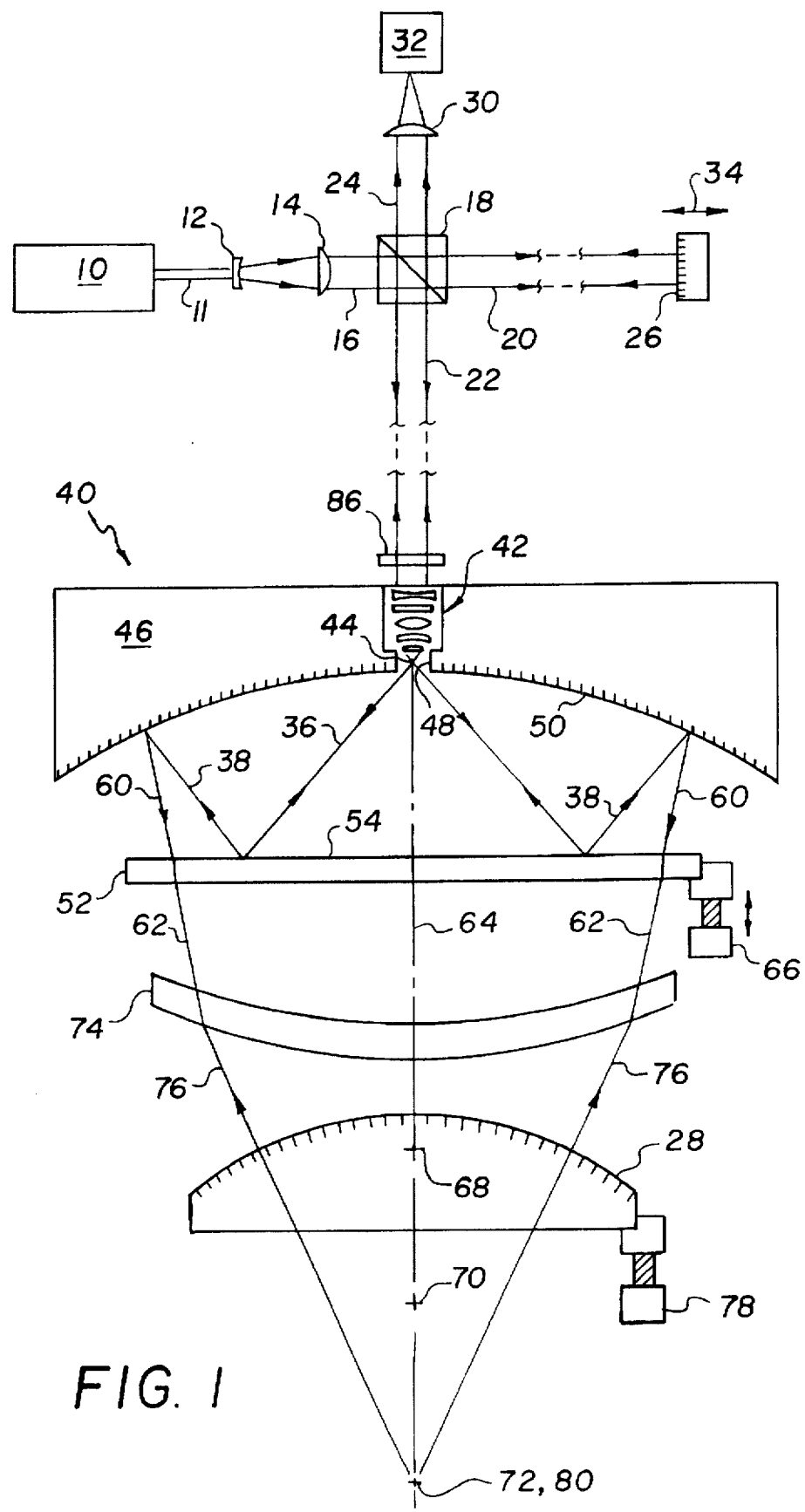
FIG. 1 is schematic depiction of my catadioptric imaging system conveying a test beam in a Twyman-Green interferometer.

FIG. 1 depicts an example of my invention embodied in a Twyman-Green interferometer. A conventional laser source 10 emits a temporally coherent light beam 11 that is reshaped by a diverging lens 12 and a collimating lens 14 into a collimated beam 16. A beamsplitter block 18 divides the collimated beam 16 into a reference beam 20 that is transmitted in one direction through the block 18 and a test beam 22 that is reflected in another direction through the block 18.

Typical of a Twyman-Green interferometer, the reference beam 20 and the test beam 22 take separate paths before returning to the beamsplitter block 18, where they are recombined to form an interference beam 24. Along their separate paths, the reference beam 20 is retroreflected by a flat reference mirror 26; and the test beam 22, after some further beam shaping, is retroreflected by a convex surface 28 under test. The interference beam 24 is projected by a field lens 30 upon the aperture of a camera or other imaging device 32 for recording an interference pattern between the reference and test beams. Any departure of the test surface 28 from its desired convex form alters the returning test beam 22 from its original form and produces variations in a fringe pattern of the recorded interferogram. The reference mirror 26 is moveable in the direction of arrows 34 to modulate the interference fringes to obtain phase information about discrete locations in the fringe pattern.

The optical path taken by the test beam 22 is controlled by a my new catadioptric imaging system 40, whose purpose is to produce a cone of light at normal incidence to the convex test surface 28. The test beam 22 enters the catadioptric imaging system 40 through a focusing lens group 42 that transforms the test beam 22 from a collimated beam into a diverging test beam 36 emanating from a point source 44.

The diverging test beam 36 projects through a transmissive central aperture 48 in a concave spherical mirror 46 onto a beamsplitter plate 52. The central aperture 48 can be formed by an actual opening in the mirror 46 or by a transmissive portion of the mirror 46 that is not entirely covered by the mirror's reflective surface 50.

The beamsplitter plate 52 has a surface 54 that is treated for partially reflecting and partially transmitting radiant energy. A portion of the diverging test beam 36 reflects from the surface 54 of the beamsplitter plate 52 back toward the concave mirror 46 as a further diverging test beam 38. The concave mirror 46 refocuses the further diverging test beam 38 as a converging test beam 60 that is transmitted through the beamsplitter plate 52 toward the convex test surface 28 as a reshaped converging test beam 62. Preferably, the concave mirror 46, the beamsplitter plate 52, and the convex test surface are located along a common optical axis 64.

Both the transmission through the beamsplitter plate 52 and any non-normal reflections from the concave mirror 46 can produce spherical aberrations in the reshaped converging test beam 62. Refraction through the beamsplitter plate 52 increases with the increasing incidence angles of the marginal rays directing them toward a focus along the optical axis 64 beyond those of incident paraxial rays (i.e., positive spherical aberration). The amount of spherical aberration produced by the beamsplitter plate 52 is proportional to its thickness, which is preferably as small as possible. However, sufficient thickness is required to limit amplification of vibrations from movements of air or supporting structures.

The non-normal reflections from the concave mirror 46 produce a spherical aberration of opposite sign, i.e., negative spherical aberration in which marginal rays focus in advance of paraxial rays. The magnitude of the non-normal reflections and the corresponding negative spherical aberration is controlled by adjusting the position of the beamsplitter plate 52 along the optical axis 64. A conventional positioning system 66 containing a stepper drive can be used for this purpose.

Movement of the beamsplitter plate 52 adjusts the effective position of the point source 44 as an object point 68 that can be varied along the optical axis 64 with respect to the concave mirror's center of curvature 70. A conjugate image point 72 approached by the converging beam 60 varies from the mirror's center of curvature 70 in an opposite direction along the optical axis 64. Any separation of the object and image conjugates 68 and 72 focuses the mirror 46 at a departure from unit magnification and produces a corresponding amount of negative spherical aberration.

According to my co-invention with George Schnable published as U.S. Pat. No. 5,155,554, which is hereby incorporated by reference, the position of the beamsplitter plate 52 is adjusted along the optical axis 64 to produce an amount of negative spherical aberration that cancels the positive spherical aberration caused by refraction through the beamsplitter plate 52. However, this limitation restricts the ranges of size and numerical aperture of the convex test surface 28 that can be measured with a given combination of concave mirror 46 and beamsplitter plate 52.

My present invention expands the measurable ranges of size and numerical aperture of the convex test surface 28 by providing an additional refractive optic 74 between the beamsplitter plate 52 and the convex test surface 28. The refractive optic 74, which can be composed of one or more refractive elements such as lenses, is designed to compensate for residual spherical aberrations caused by positions of the beamsplitter plate 52 that do not exactly cancel the spherical aberration caused by refraction through the beamsplitter plate 52. The residual aberrations corrected by the refractive optic 74 can be of either sign, caused by positions of the beamsplitter plate that either over compensate or under compensate for the positive spherical aberrations produced by refraction through the beamsplitter plate 52.

In the example of FIG. 1, the beamsplitter plate 52 is positioned closer to the concave mirror 46 than would be required for canceling the positive spherical aberration caused by refraction through the beamsplitter plate 52. In addition to overcompensating for positive spherical aberration, the closer position of the beamsplitter plate 52 expands the size and reduces the numerical aperture of the converging test beam 60. The refractive optic 74 cancels the residual negative spherical aberration and further refracts the reshaped converging test beam 62 into a further reshaped converging test beam 76 that approaches the convex test surface 28 at normal incidence.

The refractive optic 74 can also vary the numerical aperture of the further reshaped converging test beam 76 to further increase the range of measurable test surfaces. For example, FIG. 1 depicts the further reshaped converging test beam 76 with an increased numerical aperture with respect to the reshaped converging test beam 62. However, the refractive optic 74 could also be arranged to decrease the numerical aperture of the further reshaped converging test beam 76. The beamsplitter plate 52 could also be positioned farther from the concave mirror 46 than would be required for canceling the positive spherical aberration to increase the numerical aperture of the converging test beam 60.

A conventional positioning device 78 adjusts the convex test surface 28 along the optical axis 64 to a position at which the further reshaped converging test wavefront 76 impinges at normal incidence throughout the working area of the convex test surface 28. For convex spherical test surfaces, a center of curvature 80 of the test surface preferably coincides with the image point 72. The incident rays of the further reshaped converging test wavefront 76 are retroreflected by the convex test surface 28 on a return course through the point source 44 to the beamsplitter block 18. Any deviation in the collimated test wavefront 22 returning from the convex test surface 28 produces variations in the interference pattern recorded by the camera 32. With the catadioptric imaging system 40 appropriately corrected for aberrations, the variations in the interference pattern represent variations in the convex test surface 28.

Although the refractive optic 74 is generally used for correcting all of the residual spherical aberrations caused by the beamsplitter plate 52, further corrections are possible by mounting an aspheric plate 86 in advance of the focusing lens group 42. The aspheric plate 86 interrupts the collimated test beam 22 to provide a relatively fast change in the form of the test beam 22. Large aberrations can be corrected by the aspheric plate 86, leaving the final corrections to the refractive optic 74.

The point source 44 from which the diverging beam 36 emanates is preferably located as close as possible to the reflective surface 50 of the concave mirror 34 to limit the required size of the aperture 48 through the reflective surface 50. However, a conventional positioning device (not shown) could also be connected to one or more of the components of the focusing lens group 42 to adjust the position of the point source 44 for further controlling the aberrations caused by the relative position of the beamsplitter plate 52.

Figure 2:
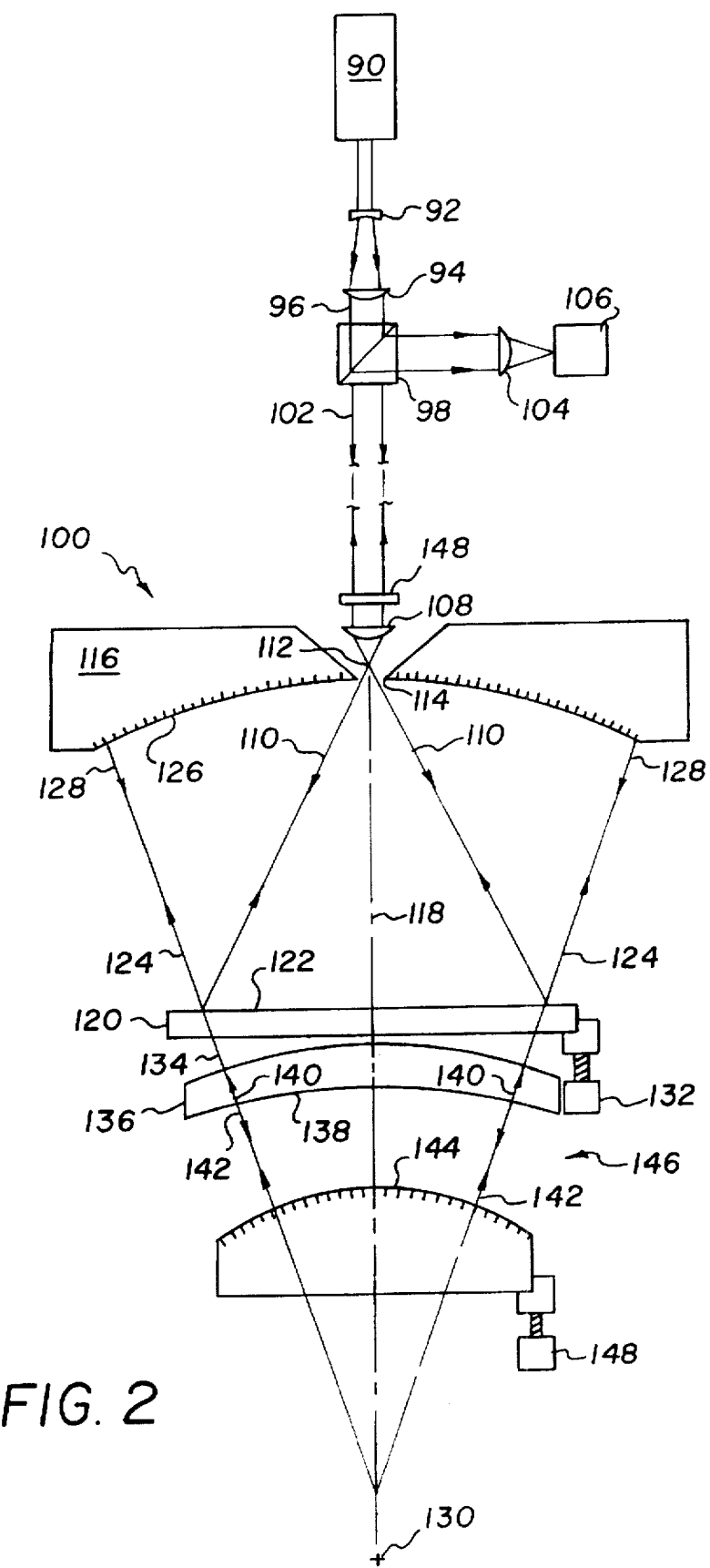
FIG. 2 is schematic depiction of an alternative catadioptric imaging system conveying both test and reference beams in a Fizeau interferometer.

A second example of my invention illustrated in FIG. 2 is embodied in a Fizeau-type interferometer for reducing sensitivity to errors in a corresponding catadioptric imaging system 100. Similar to the preceding example, a laser source 90, together with a diverging lens 92 and a collimating lens 94, produces a collimated beam 96 of coherent monochromatic light. However, a revised beamsplitter block 98 transmits the collimated beam 96 toward the catadioptric imaging system 100 as a combined test and reference beam 102 and reflects the combined test and reference beam 102 returning from the catadioptric imaging system 100 to a field lens 104 for projecting an image of a resulting interference pattern onto a camera or other imaging device 106.

The combined test and reference beam 102 enters the catadioptric imaging system 100 through a focusing lens group 108 that converts the combined beam 102 from a collimated form into a diverging beam 110 emanating from a point source 112. A central aperture 114 in a concave spherical mirror 116 allows the diverging beam 110 to propagate through the concave mirror 116 along a common optical axis 118 to a beamsplitter plate 120. A partially reflective surface 122 of the beamsplitter plate 120 returns a portion of the diverging beam 110 to the concave mirror 116 as a further diverging beam 124.

In contrast to the preceding embodiment, the further diverging beam 124 strikes a reflective surface 126 of the concave mirror 116 at normal incidence and is retroreflected as a converging beam 128 on a path toward the mirror's center of curvature 130. At this position of the beamsplitter plate 120, the converging beam 128 does not contain any spherical aberration caused by focusing the point source 112 at a departure from unit magnification. However, this position of the beamsplitter plate 120 is just one of the many more positions that are made possible by my invention. A positioning device 132 can be used to adjust the beamsplitter plate 120 in either direction along the optical axis 118 to vary the numerical aperture or the amount of spherical aberration in the converging beam 128.

A portion of the converging beam 128 is transmitted through the beamsplitter plate 120 as a slightly aberrated or reshaped converging beam 134. A refractive optic 136 removes at least part of the spherical aberration caused by refraction through the beamsplitter plate 120. An objective surface 138 of the refractive optic 136 retroreflects a portion of the converging beam 134 as a reference beam 140. The remaining portion of the converging beam 134 is transmitted through the objective surface 138 as a test beam 142 along a path of normal incidence to a convex test surface 144. The test beam 142 is retroreflected back to the objective surface 138 where it recombines with the reference beam 140 to form an interference pattern representative of any variations in the convex test surface 144. The combined reference and test beams 140 and 142 return to the beamsplitter block 98 where they are routed to the camera 106 for recording the interference pattern.

The objective surface 138 and the convex test surface 144 are preferably spaced apart by a minimum distance through a so-called Fizeau cavity 146. Except within the Fizeau cavity 146, the reference and test beams 140 and 142 remain combined along the same optical path through the catadioptric imaging system 100. Accordingly, any errors in the imaging system tend to affect both beams 140 and 142 equally. However, errors in the convex test surface 144 change the relative phase of the test beam 142 with respect to the reference beam 140, which can be interpreted in the resulting interference pattern as a measure of the test surface error.

A conventional positioning device 148 adjusts the position of the convex test surface 144 along the optical axis 118.

Phase shifting is preferably accomplished by moving the convex test surface 144 along the optical axis 118 or by similarly moving the objective surface 138 with a similar positioning device (not shown).

Both the beamsplitter plate 120 and the refractive optic 134 have important functions beyond their effect on spherical aberration. For example, the position of the beamsplitter plate 120 adjusts numerical aperture of the converging beam 128, and the refractive optic 134 provides an objective surface 136 for a Fizeau cavity 146. An aspheric plate 148 can be mounted in advance of the focusing lens group 108 to make large-scale corrections to the spherical aberration of the combined test and reference beam 102. The aspheric plate 148 is especially effective for reducing the number of optical elements in the refractive optic 134, which could otherwise limit the size of the convex test surface 144.

Figure 3:
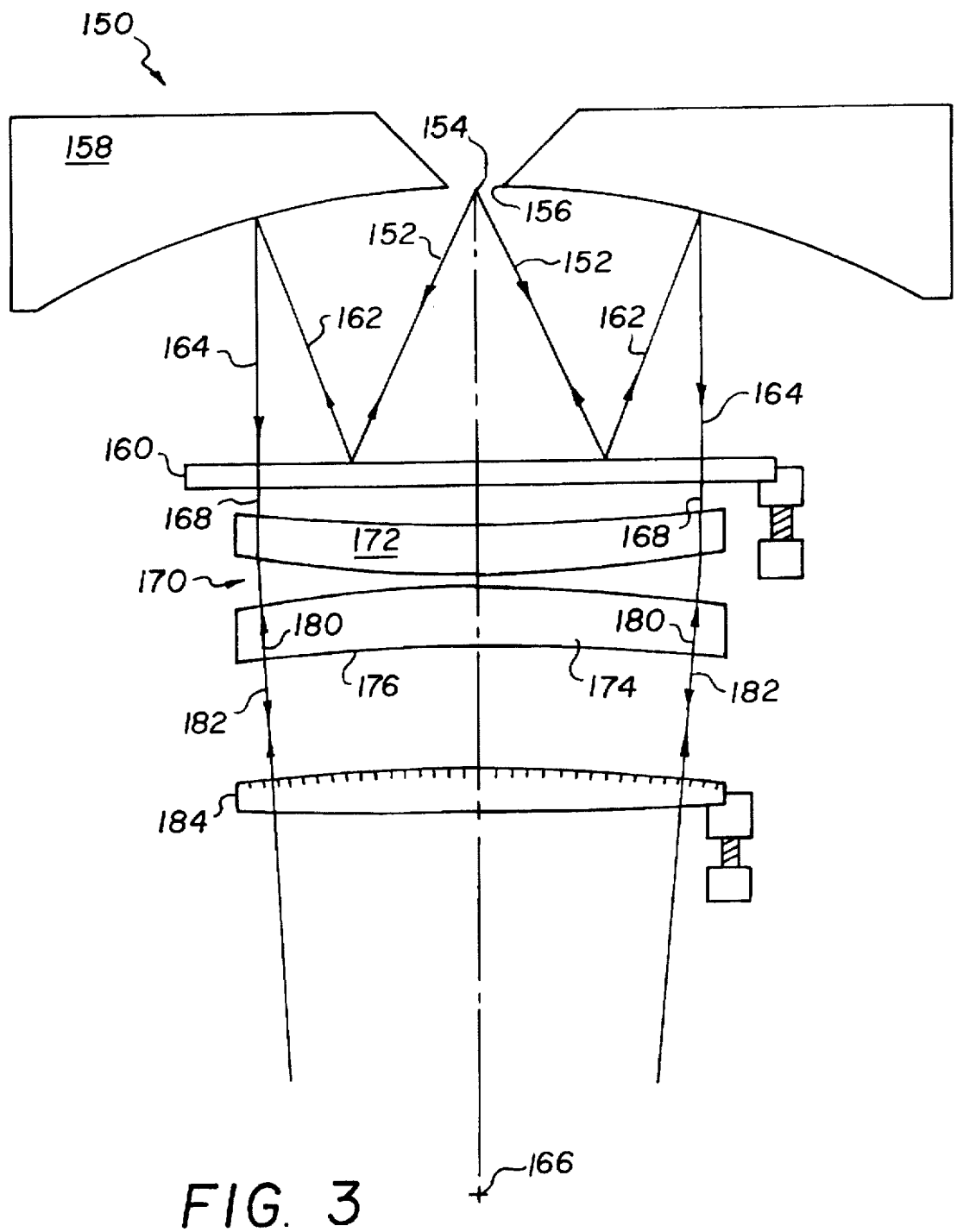
FIG. 3 is a alternative catadioptric imaging system for measuring surfaces with small numerical apertures.
Figure 4:
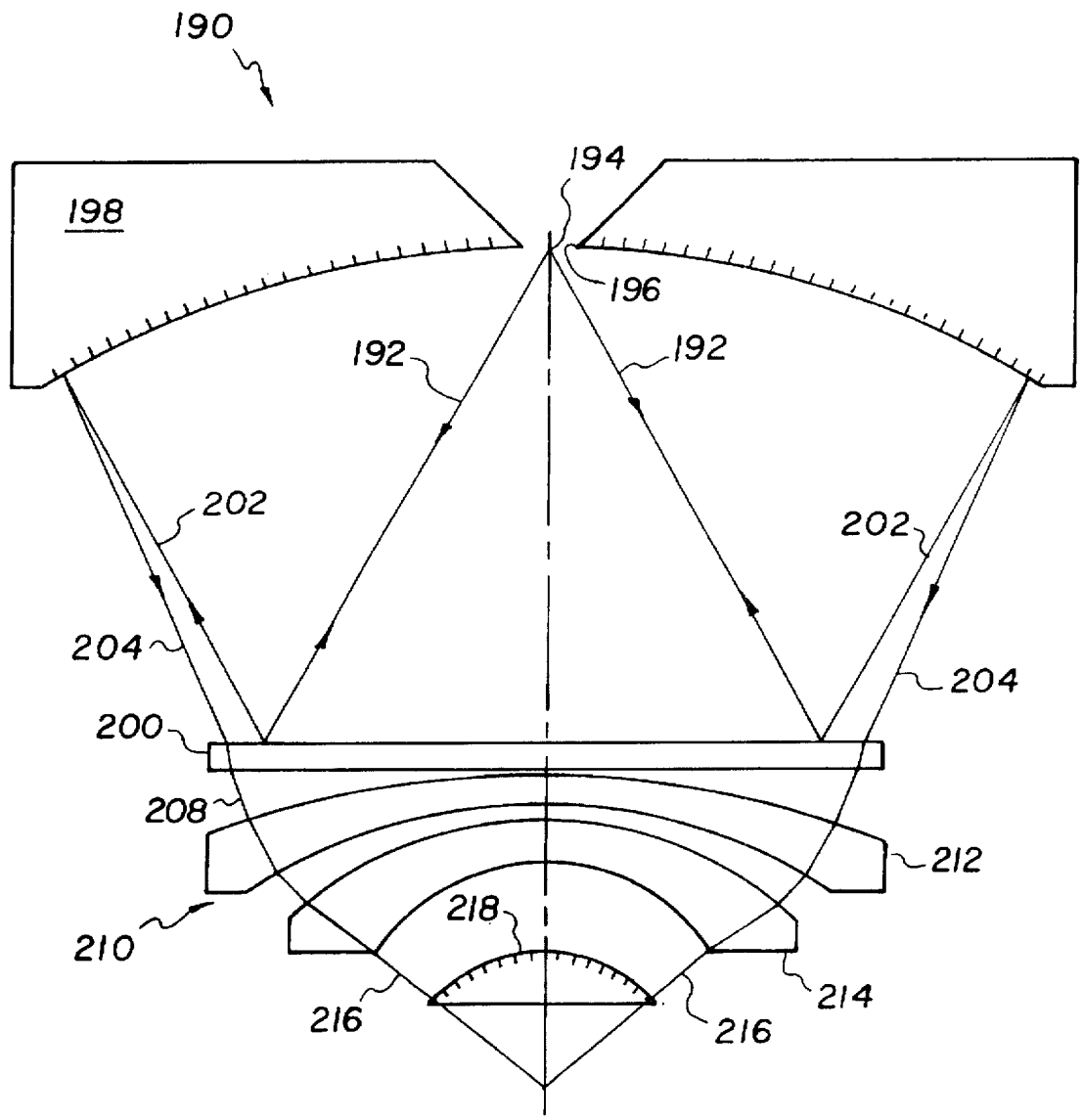
FIG. 4 is a alternative catadioptric imaging system for measuring surfaces with large numerical apertures.

FIGS. 3 and 4 show two additional catadioptric imaging systems 150 and 190 arranged in accordance with my invention. The arrangement of FIG. 3 significantly reduces numerical aperture. The arrangement of FIG. 4 significantly increases numerical aperture.

In FIG. 3, a diverging beam 152 emanates from a point source 154 near a central aperture 156 of a concave spherical mirror 158. A beamsplitter plate 160 reflects a portion of the diverging beam 152 back toward the concave mirror 158 as a further diverging beam 162. The concave mirror 158 reflects the further diverging beam 162 as a narrow-angle beam 164 having a wavefront with little curvature. The narrow-angle beam 164 converges toward a focus that is well beyond the center of curvature 166 of the concave mirror 158. In fact, the beamsplitter plate 160 could also be positioned close enough to the concave mirror 158 to produce a slightly diverging narrow-angle beam.

Transmission of the narrow-angle beam 164 through the beamsplitter plate 160 produces a reshaped narrow-angle beam 168 containing some spherical aberration caused by refraction through the beamsplitter plate 160. However, the reshaped narrow-angle beam 168 contains an even greater amount of opposite sign spherical aberration caused by the proximity of the beamsplitter plate 160 to the concave mirror 158.

A refractive optic 170 includes two lens components 172 and 174 for further reshaping the reshaped narrow-angle beam 168. Both components 172 and 174 further compensate for the greater spherical aberration of the beamsplitter plate position. However, an objective surface 176 of the component 174 also functions as a Fizeau surface for retroreflecting a portion of the further reshaped narrow-angle beam as a reference beam 180 and for transmitting a remaining portion of the further reshaped narrow-angle beam as a test beam 182.

A convex test surface 184 substantially retroreflects the test beam 182 back to the final surface 176 where it recombines with the reference beam 180 to produce a pattern of interference indicative of any variations in the test surface 184. A similar return path through the catadioptric imaging system 150 conveys the combined reference and test beams 180 and 182 to a camera or other recording device (not shown) for measuring the relative intensities of different points within the interference pattern.

In FIG. 4, the catadioptric imaging system 190 also starts with a diverging beam 192 emanating from a point source 194 located near a central aperture 196 of a concave spherical mirror 198. A beamsplitter plate 200 reflects a portion of the diverging beam 192 back toward the concave spherical mirror 198 as a further diverging beam 202. However, the beamsplitter plate 200 is positioned at a sufficient distance from the concave mirror 198 so that the further diverging beam 202 strikes the concave mirror 198 at near normal incidence. As a result, the concave mirror reflects the further diverging beam 202 as a wide-angle beam 204.

Transmission of the wide-angle beam 204 produces the usual aberration in a reshaped wide-angle beam 208 as does the position of the beamsplitter plate 200. A refractive optic 210 containing two lens components 212 and 214 further reshapes the reshaped wide-angle beam 208 into a wider-angle beam 216 having an even larger numerical aperture. Both components 212 and 214 also correct any residual aberrations in the wider-angle beam 216 caused by the beamsplitter plate 200.

The wider-angle beam 216 functions as a test beam by retroreflecting from a convex test surface 218 on a return course through the catadioptric imaging system 190 to a beamsplitter (not shown) where the test beam is recombined with a reference beam. Phase differences between the test and reference beams are interpretable as variations in the convex test surface 218.

I claim:

1. A catadioptric imaging system of an interferometer for measuring a convex surface comprising:

a light source for producing a diverging beam of light;

a beamsplitter plate having a partially reflective surface for reflecting the diverging beam as a further diverging beam;

a concave mirror for reflecting the further diverging beam as a converging beam;

said partially reflective surface of the beamsplitter plate also being partially transmissive for transmitting the converging beam toward the convex surface;

a support for mounting the convex surface in a position for reflecting the converging beam as a re-diverging beam on a return path toward the light source;

said beamsplitter plate having a thickness and a position relative to said concave mirror that produce a residual spherical aberration in the converging beam; and a refractive optic located between said beamsplitter plate and said support for at least partially canceling the residual spherical aberration caused by the thickness and position of the beamsplitter plate.

2. The imaging system of claim 1 in which a reference position of said beamsplitter plate is defined as a position at which the reflection from the beamsplitter plate cancels spherical aberration caused by the transmission through the thickness of the beamsplitter plate.

3. The imaging system of claim 2 in which said beamsplitter plate is moved closer to said concave mirror than said reference position for decreasing a numerical aperture of the converging beam.

4. The imaging system of claim 3 in which said refractive optic further decreases the numerical aperture of the converging beam.

5. The imaging system of claim 2 in which said beamsplitter plate is moved farther from said concave mirror than said reference position for increasing a numerical aperture of the converging beam.

6. The imaging system of claim 5 in which said refractive optic further increases the numerical aperture of the converging beam.

7. The imaging system of claim 1 further comprising a focusing system that receives a beam of light from the light source and converts the beam into the diverging beam.

8. The imaging system of claim 7 further comprising a focusing system support for adjusting a location of a point source for the diverging beam.

9. The imaging system of claim 7 further comprising an aspherical optical element interrupting the beam of light from the light source for further correcting aberration in the converging beam.

10. The imaging system of claim 9 in which said focusing system transforms a collimated beam from the light source into the diverging beam and projects the diverging beam through an aperture in said concave mirror.

11. The imaging system of claim 10 in which said aspherical optical element interrupts the collimated beam.

12. The imaging system of claim 1 in which said refractive optic has an objective surface for producing a pattern of interference between a portion of the converging beam that is reflected from said objective surface and the re-diverging beam reflected from the convex surface.

13. The imaging system of claim 12 in which one portion of the converging beam strikes the objective surface at substantially normal incidence and another portion of the converging beam strikes the convex surface at substantially normal incidence.

14. The imaging system of claim 13 in which said refractive optic includes a plurality of refractive optical elements and said objective surface is located on said refractive optical element closest to the convex surface.

15. An interferometer for measuring a convex spherical surface comprising:
- a light source for producing a beam of monochromatic light that is shaped into a diverging beam of light;
- a concave mirror having a transmissive area for projecting the diverging beam of light;
- a beamsplitter for partially reflecting the diverging beam into a further diverging beam;
- said concave mirror being positioned for reflecting the further diverging beam as a converging beam;
- an objective surface that reflects a first portion of the converging beam as a reference beam on a return path toward said beamsplitter; and
- a support for mounting the convex surface in a position that reflects a second portion of the converging beam as a test beam on a return path toward said beamsplitter,
- wherein said test and reference beams produce a pattern of interference at said objective surface representative of variations in the convex surface.

16. The interferometer of claim 15 in which said objective surface is formed on a refractive optic located between said beamsplitter and said support.

17. The interferometer of claim 16 in which said beamsplitter transmits the converging beam toward said objective surface and has a thickness that introduces a first spherical aberration into the converging beam.

18. The interferometer of claim 17 in which said beamsplitter is located with respect to said concave mirror in a position that introduces a second spherical aberration into the converging beam.

19. The interferometer of claim 18 in which said refractive optic introduces into the converging beam a third spherical aberration that at least partially cancels a combination of the first and second spherical aberrations.

20. The interferometer of claim, 19 further comprising an adjustable support for mounting said beamsplitter in different positions for modifying the second spherical aberration.

21. The interferometer of claim 18 further comprising a focusing system that converges the beam of monochromatic light through a point source for shaping the diverging beam of light.

22. The interferometer of claim 21 further comprising a positioning system for adjusting the position of the point source with respect to said concave mirror for adjusting the second spherical aberration introduced by said beamsplitter plate.

23. The interferometer of claim 15 further comprising an aspherical optical element located between said light source and said concave mirror for introducing a fourth spherical aberration that further reduces a total of said first, second, and third spherical aberrations.

24. The interferometer of claim 23 further comprising a focusing system that converts a collimated beam from said light source into the diverging beam.

25. The interferometer of claim 24 in which said aspherical optical element is incident to the collimated beam from the light source.

26. A catadioptric imaging system for conveying a beam of light at normal incidence to a test surface of an interferometer comprising:
- a concave mirror having a central aperture for at least partially transmitting the beam of light through said concave mirror;
- a beamsplitter for reflecting a portion of the beam of light back toward said concave mirror;
- said concave mirror for reflecting the beam portion back toward the beamsplitter plate;
- said beamsplitter including a body for transmitting a portion of the reflected beam portion; and
- a refractive optic for directing the transmitted beam portion to the test surface at normal incidence.

27. The system of claim 26 in which said refractive optic includes an objective surface for retroreflecting a portion of the transmitted beam portion as a reference beam and for further transmitting the transmitted beam portion as a test beam.

28. The system of claim 27 in which the test surface is positioned for substantially retroreflecting the test beam toward said objective surface for forming an interference pattern with the reference beam indicative of variations in the test surface.

29. The system of claim 26 further comprising a positioning device for adjusting a position of said beamsplitter with respect to a reference position at which spherical aberration in the reflected beam portion cancels spherical aberration in the transmitted beam portion caused by transmission through said beamsplitter.

30. The system of claim 29 in which said beamsplitter is positioned closer to said concave mirror than said reference position for decreasing numerical aperture of the reflected beam portion.

31. The system of claim 29 in which said beamsplitter is positioned farther from said concave mirror than said reference position for increasing numerical aperture of the reflected beam portion.

32. The system of claim 29 in which said beamsplitter is positioned at a distance from said reference position and said refractive optic at least partially cancels a remaining portion of the spherical aberration in the transmitted beam portion.

33. The system of claim 29 in which said beamsplitter is positioned at a distance from said reference position and said refractive optic changes a numerical aperture of the transmitted beam portion.

34. The system of claim 26 further comprising an aspheric plate for at least partially canceling spherical aberration associated with said beamsplitter and said refractive optic.

* * * * *